United States Patent [19]
Rogers

[11] 3,768,991
[45] Oct. 30, 1973

[54] METHOD FOR SEALING AN ENCLOSURE FOR AN ELECTRONIC COMPONENT

[75] Inventor: Bryant C. Rogers, La Jolla, Calif.

[73] Assignee: Diacon, Inc., San Diego, Calif.

[22] Filed: June 14, 1972

[21] Appl. No.: 262,798

[52] U.S. Cl. .................. 65/36, 29/582, 29/591, 65/59
[51] Int. Cl. .................................. C03c 27/02
[58] Field of Search ............... 65/36, 42, 59; 29/580, 581, 582, 591

[56] References Cited
UNITED STATES PATENTS
| | | | |
|---|---|---|---|
| 2,512,971 | 6/1950 | Roovers | 65/36 X |
| 3,281,606 | 10/1966 | Lueck | 65/59 X |
| 3,312,540 | 4/1967 | Plumbo et al. | 65/59 |
| 3,346,357 | 10/1967 | Baak | 65/36 X |

*Primary Examiner*—Robert L. Lindsay, Jr.
*Attorney*—Roger S. Borovoy

[57] ABSTRACT

A method for sealing an enclosure for an electronic component, the enclosure including a base having on one face a composite glass layer, and a cap having a face to be joined with the base which is free from any glass layer. The method includes heating the cap to raise the temperature of its glass-free face to a temperature greater than the softening point of the glass layer on the base, and joining the heated glass-free face of the cap with the glassed face of the base, thereby softening the glass layer of the base, and cooling the joined cap and base to form a seal between them at the interface of the joined faces.

4 Claims, 2 Drawing Figures

PATENTED OCT 30 1973  3,768,991

METHOD FOR SEALING AN ENCLOSURE FOR AN ELECTRONIC COMPONENT

BACKGROUND OF THE INVENTION

1. Field of the Invention

This invention generally relates to the field of sealing packages, normally glassed ceramic packages, to form hermetic enclosures for semiconductor devices.

2. Prior Art

According to prior practice, exemplified by U.S. Pat. No. 3,404,213, the cap and a base for a semiconductor package to be sealed together both have a glass layer on one surface. The two glass layers are then placed adjacent each other and the entire structure heated until the glass layers soften and fuse together to form a glass seal.

One disadvantage of the sealing techniques of the prior art is that a glass layer is required both on the cap and on the base. Not only is an extra glazing operation required for the cap, but, once glazed, these caps are not storable for any length of time at elevated temperatures. Secondly, during sealing, it is necessary to heat the base, including the delicate semiconductor device to be enclosed, to a temperature sufficient to soften the glass of the base, thereby, in many instances, doing damage to the electrical properties of the device.

SUMMARY OF THE INVENTION

Briefly, the method of this invention for sealing an enclosure for an electronic component, the enclosure including a base having on one face a composite glass layer having a first lower portion which is substantially devitrified and a second upper portion which is substantially non-devitrified, and a cap having the face to be joined to the base free from any glass layer, includes the following steps: (1) heating the cap to raise the temperature of its glass-free face to a temperature greater than the softening point of the glass layer on the base; (2) joining the heated glass-free face of the cap with the glassed face of the base, thereby softening the glass layer on the face of the base; and (3) cooling the joined cap and base, thereby forming a seal between the cap and the base at the interface between the joined faces. Preferably, the method of the invention also includes the additional step of heating the base to raise the temperature of the glass layer to a temperature below its softening point prior to joining the cap to the base.

Since the cap does not require any glass layer, and must remain glass-free, the cap-glazing operation required in the prior art has been eliminated. These unglazed caps may be stored at elevated temperatures without any deleterious effect — contrary to what was possible using prior art sealing techniques such as described in U.S. Pat. No. 3,404,213. And, since the base is heated to a temperature lower than the softening point of the glass, damage to the semiconductor device is minimized or eliminated. Finally, the equipment required for the technique of the invention is much simpler, more compact, less costly, and more easily employed in clean-room conditions than the larger, more expensive conventional belt furnaces of the prior art.

The specifics of the sealing technique of the invention will be more clearly understood from the more detailed description which follows:

DETAILED DESCRIPTION OF THE INVENTION

Figure 1:
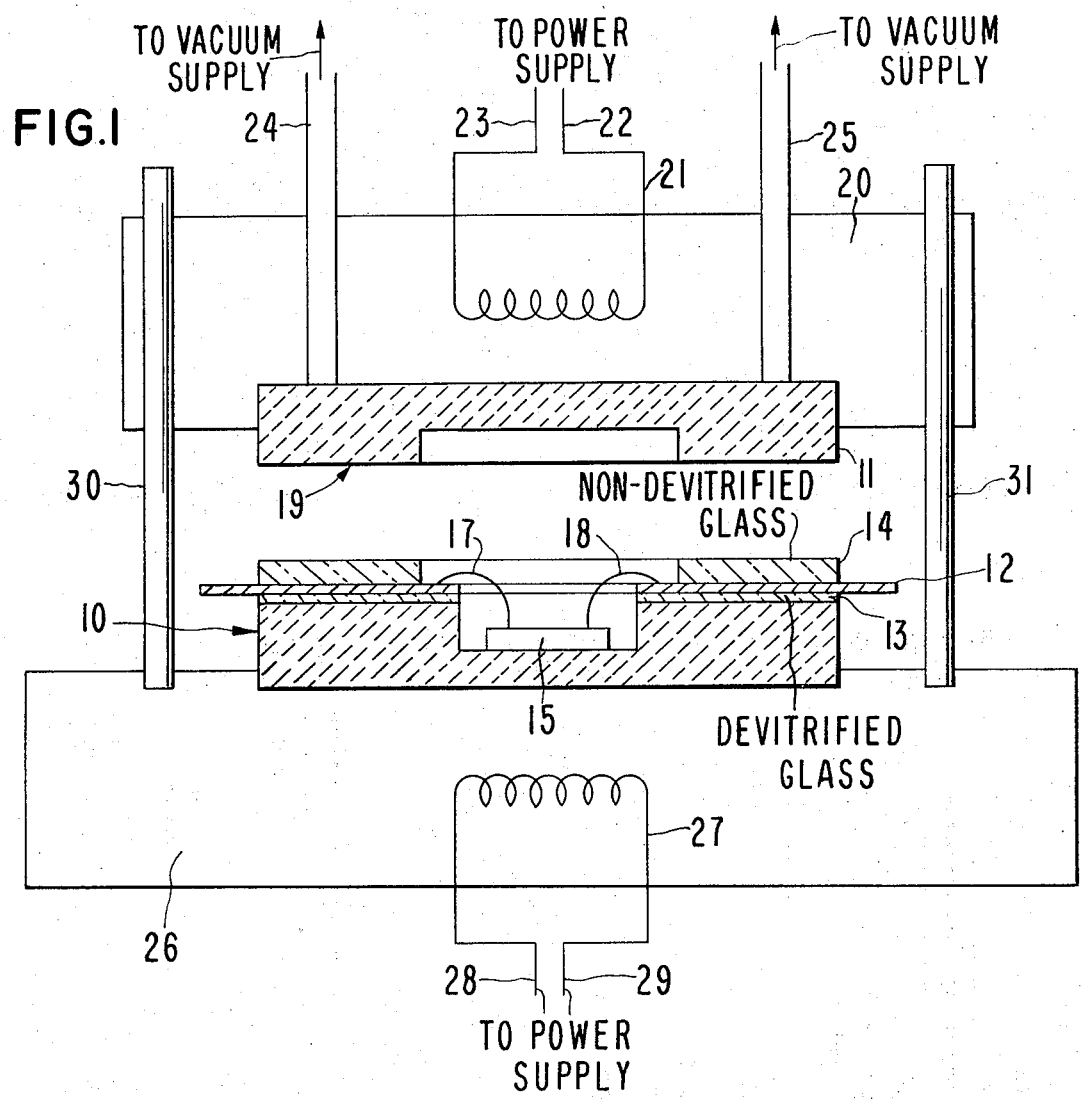
FIG. 1 shows the apparatus used in the method of the invention to hold and to heat the cap and base during the sealing operation of the invention.

The sealing operation of the invention employs a base 10 and a cap 11. The base 10 is normally a ceramic material conventionally employed in the semiconductor industry. A conductive lead frame 12 is firmly attached to the base 10, being embedded in a composite glass layer comprising layers 13 and 14. The first lower portion 13 is substantially devitrified. The second upper portion 14 is substantially non-devitrified both devitrified and non-devitrified glass layers are well known in the art, and are described in U.S. Pat. Nos. 3,258,350 and 3,697,666. The lead frame 12 has surfaces, as shown in FIG. 1, exposed for electrical contact both within and without the perimeter of base 10, the intermediate part of the lead frame between the exposed portions being embedded in the composite glass layer 13, 14. Semiconductor device 15 is attached to base 10 within cavity 16. Wires 17 and 18 are used to interconnect the active portions of the semiconductor device 15 with the metal conductive leads 12.

Cap 11, shown in FIG. 1, has a glass-free face 19. It is this glass-free face 19 which will be sealed to glass layer 13, 14 on base 10.

In the method of the invention, the cap 11 is heated, using heater block 20, to a temperature greater than the softening point of the glass layer 14 on the face of base 10. Heater block 20 is heated using coils 21 which are connected through leads 22 and 23 to a conventional power supply. To hold cap 11 within the block 20, conventional vacuum techniques are employed, using vacuum lines 24 and 25 which are connected to a conventional vacuum supply.

In a preferred embodiment of the invention, base 10 is also heated. Base 10 is mounted in a separate heating block 26 which is heated by coil 27 connected through leads 28 and 29 to a power supply. Base 10, which rests in block 26, is heated sufficiently so that the glass layer 13, 14 reaches a temperature below its softening point. If the glass layer is heated to a temperature at or above its softening point, the leads 12 may tend to shift, premature devitrification of the sealing glass may occur, and unreliable sealing would be the result. Accordingly, it is essential to the invention that the glass layer 13, 14 remains at a temperature below its softening point up until the time when it is contacted by heated cap 11.

In accordance with the invention, as explained above, after the heating has been completed, cap 11 and base 10 are contacted together. Heating block 20 is supported on rods 30 and 31 so that the heating block and the cap, held by the vacuum in lines 24 and 25, may be lowered into the position where face 19 of cap 11 contacts the glass layer 14 of base 10. Many techniques may be used for the movement of block 20, the one shown being merely illustrative.

The heat conducted from block 20 through cap 11 and through face 19 serves to soften the glass of glass layer 14, thereby effecting the seal between the two parts of the package upon contact.

After the sealing operation has been completed, the vacuum is disconnected from tubes 24 and 25, thereby releasing cap 11 from block 20. Heater block 20 is then raised so that the sealed package may be removed from the lower heater block 26. At that time a new cap is inserted into heater block 20, the vacuum supply is again connected through lines 24 and 25 to hold the new cap, and a new base is inserted into lower heater block 26. The equipment is then ready for repetition of the sealing operation.

Figure 2:
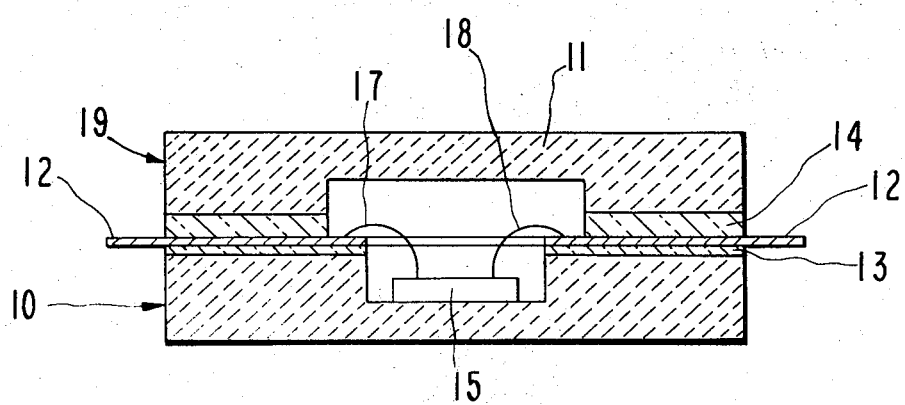
FIG. 2 shows the package after it has been sealed in accordance with the method of the invention.

The final package, sealed in accordance with the method of this invention, is shown in FIG. 2. The parts are numbered exactly as in FIG. 1, for ease of comparison.

What is claimed is:

1. A method for sealing an enclosure for an electronic component, said enclosure including a base having on one face a composite glass layer having a first lower portion which is substantially devitrified and a second upper portion which is substantially non-devitrified, and a cap having a face to be joined to said base which is free from any glass layer, the method comprising:

heating said cap to raise the temperature of said glass-free face to a temperature greater than the softening point of said glass layer;

joining said heated glass-free face of said cap with the glassed face of said base, thereby softening the glass layer of the base; and cooling the joined cap and base, thereby forming a seal between the cap and base at the interface between the joined faces.

2. The method of claim 1 further characterized by the additional step of heating said base to raise the temperature of said glass layer to a temperature below its softening point prior to joining the cap to the base.

3. The method of claim 1 further characterized by the heating of said cap being accomplished by applying a heated, heat-conductive member to the face of said cap opposite from the face to be joined to said base, and conducting the heat from said member through the cap to heat the face to be joined to said base.

4. The method of claim 2 further characterized by the heating of said base being accomplished by applying a heated, heat-conductive member to the face of said base opposite from said glassed face, and conducting the heat from said member through the base to heat said glassed face.

* * * * *